US011328291B2

(12) United States Patent
Hurt et al.

(10) Patent No.: US 11,328,291 B2
(45) Date of Patent: May 10, 2022

(54) CAR WALLET APPLICATION

(71) Applicant: First Data Corporation, Greenwood Village, CO (US)

(72) Inventors: Andrew Hurt, Centennial, CO (US); Shaun Worley, Highlands Ranch, CO (US)

(73) Assignee: FIRST DATA CORPORATION, Brookfield, WI (US)

( * ) Notice: Subject to any disclaimer, the term of this patent is extended or adjusted under 35 U.S.C. 154(b) by 1397 days.

(21) Appl. No.: 14/957,372

(22) Filed: Dec. 2, 2015

(65) Prior Publication Data

US 2016/0086170 A1   Mar. 24, 2016

Related U.S. Application Data

(62) Division of application No. 12/201,122, filed on Aug. 29, 2008, now Pat. No. 9,213,973.

(51) Int. Cl.
| | | |
|---|---|---|
| *G06Q 20/36* | (2012.01) | |
| *G06Q 20/20* | (2012.01) | |
| *G06Q 20/32* | (2012.01) | |
| *G06Q 20/38* | (2012.01) | |
| *G06Q 20/40* | (2012.01) | |
| *G06Q 30/04* | (2012.01) | |
| *G06Q 30/06* | (2012.01) | |

(Continued)

(52) U.S. Cl.
CPC ........ *G06Q 20/3674* (2013.01); *B60K 35/00* (2013.01); *G06Q 20/20* (2013.01); *G06Q 20/202* (2013.01); *G06Q 20/32* (2013.01); *G06Q 20/322* (2013.01); *G06Q 20/3223* (2013.01); *G06Q 20/3278* (2013.01); *G06Q 20/3821* (2013.01); *G06Q 20/40* (2013.01); *G06Q 30/04* (2013.01); *G06Q 30/06* (2013.01); *G06Q 40/00* (2013.01); *G06Q 40/02* (2013.01)

(58) Field of Classification Search
CPC ...... G01C 21/26; G07B 15/063; B60K 35/00; G06Q 20/202; G06Q 20/3278; G06Q 20/3674
USPC .......................................................... 705/64
See application file for complete search history.

(56) References Cited

U.S. PATENT DOCUMENTS 5,424,727 A * 6/1995 Shieh
6,711,474 B1 * 3/2004 Treyz et al.
(Continued)

OTHER PUBLICATIONS

International Search Report and Written Opinion dated Dec. 10, 2008 for International Patent Application No. PCT/US2008/80012, 11 pages.

*Primary Examiner* — James D Nigh
*Assistant Examiner* — Yin Y Choi
(74) *Attorney, Agent, or Firm* — Foley & Lardner LLP

(57) ABSTRACT

Embodiments of the disclosure generally relate to systems and methods for processing electronic payments for retail services and goods delivered by a retail establishment. In embodiments, a mobile wallet application is installed in the automobile. The automobile wallet application can receive and/or send transaction and payment information over a near field communication system to a retailer and on to an authorizing authority. The authorizing authority receives the payment and transaction information, authorizes or declines the payment of the transaction, and forwards the authorization or declination to the automobile wallet application. If authorized, the retailer provides the retail good or service.

15 Claims, 10 Drawing Sheets

(51) Int. Cl.
  *G06Q 40/00*  (2012.01)
  *G06Q 40/02*  (2012.01)
  *B60K 35/00*  (2006.01)

(56) References Cited

U.S. PATENT DOCUMENTS

| | | |
|---|---|---|
| 8,025,226 B1* | 9/2011 | Hopkins, III et al. |
| 2002/0112171 A1* | 8/2002 | Ginter et al. |
| 2003/0141363 A1* | 7/2003 | Hjelmvik |
| 2004/0214597 A1* | 10/2004 | Suryanarayana et al. |
| 2004/0243517 A1* | 12/2004 | Hansen |
| 2005/0027543 A1* | 2/2005 | Labrou et al. |
| 2005/0236477 A1* | 10/2005 | Chase |
| 2008/0071882 A1* | 3/2008 | Hering et al. |
| 2009/0106160 A1* | 4/2009 | Skowronek |
| 2010/0280956 A1* | 11/2010 | Chutorash et al. |
| 2014/0213176 A1* | 7/2014 | Mendelson |

* cited by examiner

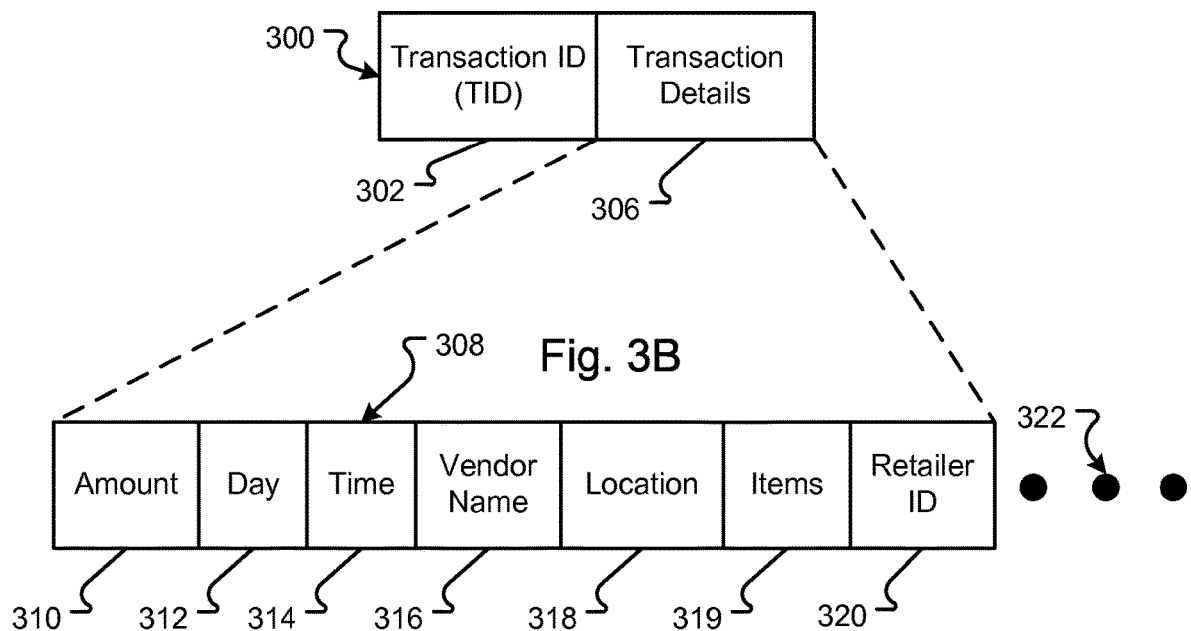
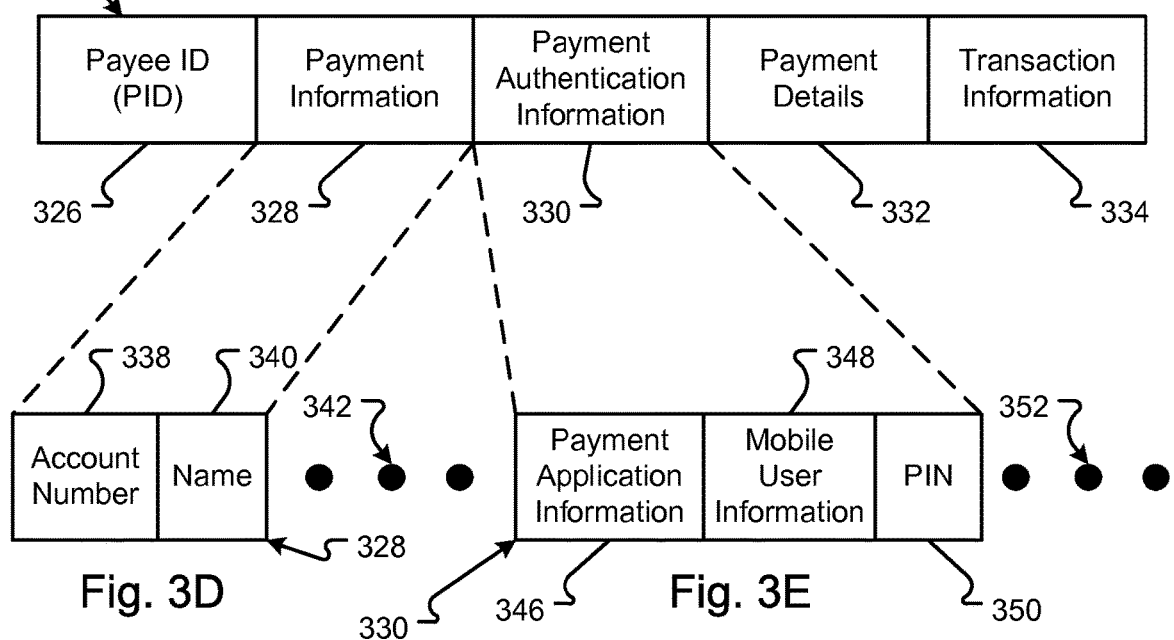

CAR WALLET APPLICATION

CROSS REFERENCE

This application is a divisional of U.S. application Ser. No. 12/201,122, filed Aug. 29, 2008, the disclosure of which is incorporated by reference herein in its entirety.

BACKGROUND

Consumers are buying retail goods and services from their automobiles at an ever-increasing rate. Many neighborhoods have drive-through restaurants, drive-through liquor stores, drive-through car washes, etc. Other services or goods may be purchased from or near the automobile but are not drive-through service. For example, consumers may purchase gasoline from a pay-at-the-pump service station. Generally, consumers have to interact with a machine or retail device outside the automobile to make payment for the service or good. The retail device allows the consumer to make a purchase without having a person attending the machine.

Some recent advances have allowed consumers to pay the retail device for the retail services or goods with a credit or debit account. The retail device can receive payment information from the consumer and send the information to an authorizing authority to approve the transaction and/or the payment. After receiving the authorization, the retail device provides the service or good. However, even this process of paying the retail device can be slower than desired. Further, the sales process often requires the consumer to use a physical credit card which must be located and physically presented for payment.

It is in view of these and other considerations not mentioned herein that the embodiments of the present disclosure were envisioned.

SUMMARY

Embodiments of the disclosure generally relate to systems and methods for processing electronic payments for retail services and goods delivered by a retail establishment. In embodiments, a mobile wallet application is installed in the automobile. The automobile wallet application can receive and/or send transaction and payment information over a near field communication (NFC) system to a retailer and on to an authorizing authority. The authorizing authority receives the payment and transaction information, authorizes or declines the payment of the transaction, and forwards the authorization or declination to the automobile wallet application. If authorized, the retailer provides the retail good or service.

BRIEF DESCRIPTION OF THE DRAWINGS

The present disclosure is described in conjunction with the appended figures:

FIGS. 3A-E are block diagrams of embodiments of one or more data structures for communicating transaction and/or payment information in a system for authorizing contactless payment;

DETAILED DESCRIPTION

Figure 1:
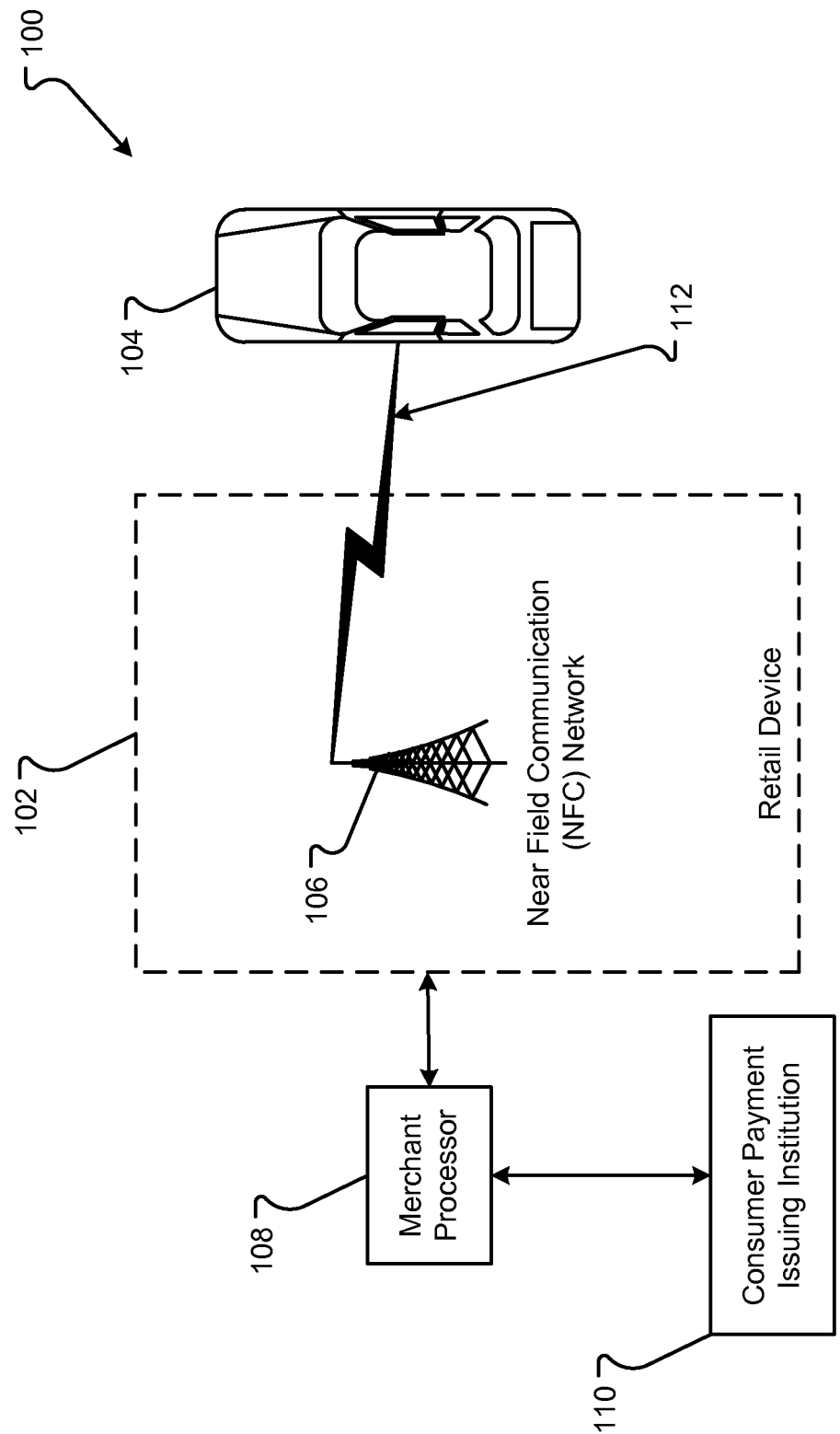
FIG. 1 is a block diagram of an embodiment of a system operable to authorize contactless payments between a consumer and a retail device.

Embodiments described herein provide for an automobile wallet appliance. The automobile wallet appliance may provide contactless payments between a mobile wallet application resident in a consumer's automobile and a retail device resident at a retailer. The payments may be referred to as "contactless" payments. The transaction is "contactless" in that the retail device and the automobile wallet application do not require physical contact to complete the transaction. In other words, the consumer need not provide a physical credit card, cash, debit card, etc.

As an example, a consumer may drive into a drive-through (e.g., McDonalds®). The consumer can place an order at the ordering kiosk. When in vicinity of a near field communication (NFC) system at the check out window, a mobile wallet application initiates. The mobile wallet application can leverage the user interface (e.g., the GPS display) in the automobile to provide information to the consumer and receive inputs from the consumer. For example, the mobile wallet application can provide a display showing what the consumer ordered and the amount to be paid. Then, the mobile wallet application can request the consumer to provide a payment type. For example, the mobile wallet application can ask if the user wants to use his or her VISA card to complete the transaction. The consumer can make a selection at the user interface in the automobile. In embodiments, a NFC transceiver in the automobile sends the payment information to a NFC transceiver at the retailer. The retailer can then complete the credit card transaction, receive authorization, and provide the consumer his or her goods. Thus, the embodiment presented herein provide advantages in speed (no exchange of a physical credit card), in convenience (no need to present credit card and easy use of display in the car), and in security (transactions are completed without the knowledge of the sales person).

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. In some embodiments, a computing system may be used to execute any of the tasks or operations described herein. In embodiments, a computing system includes memory and a processor and is operable to execute computer-executable instructions stored on a computer-readable medium that define processes or operations described herein.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

An embodiment of a system 100 for providing electronic payment for a retail service or good from an automobile wallet appliance 104 is shown in FIG. 1. An automobile wallet appliance or automobile appliance 104 is a system or device integrated into an automobile that interacts with a retail device 102. The automobile appliance 104 is a software and/or hardware system that functions in the automobile of the consumer. The retail device 102 can be a system associated with a retailer to accept payment for a retail service or good. In embodiments, the retail device 102 is operable to communicate with the automobile wallet appliance 104 using a first communications channel 112.

The first communications channel 112 provides communications between the automobile wallet appliance 104 and the retail device 102. The first communications channel 112 may be any type of communications system including wireless, wired, or other communication system. In one embodiment, the first communications channel 112 is a wireless communication channel, and, in some embodiments, is a NFC compliant channel 112. If a wireless communication channel, the first communication channel can be Bluetooth®, 802.11g, or other wireless system.

The automobile appliance 104, in embodiments, is a consumer's automobile appliance that is in the consumer's automobile. The automobile appliance 104 is operable to receive communications from and send communications to the retail device 102. The automobile appliance 104 can leverage the systems of the car, that is, the GPS user interface, the radio system, memory for the GPS system, etc., to interact with the consumer in his or her car. In embodiments, the automobile wallet appliance 104 also includes a NFC system 106 to communicate with the retailer. The NFC system 106 may be embedded in the structure of the automobile.

In alternative embodiments, the automobile appliance 104 is operable to communicate with a wireless network to receive communications from and send communications to an account system. The wireless network may be provided from a Bluetooth interface to the consumer's mobile phone and then to a website that manages account information. This interface to the account information allows the user to make changes to the information or settings for the automobile wallet appliance 104.

In embodiments, the system 100 includes a communications link to a merchant processor 108. The system 100 may use a second communications channel that allows the retail device 102 to communicate with a merchant processor 108, which may be located in a distant area. For example, the retail device 102 communicates with the merchant processor 108, which is located in another state or country. The second communications channel may be a cellular network, a wireless LAN or WAN, or other communication system.

The merchant processor 108, in embodiments, is a merchant acquirer or other entity that processes credit or debit authorizations. For example, the merchant processor 108 is VISA® or MASTERCARD®. In other embodiments, the merchant processor 108 is a financial institution, for example, a bank, that processes credit or debit authorizations and/or approves debits or credits to a consumer's financial account. The merchant processor 108 may have a predefined relationship with the institution that operated the retail device 102 or with the consumer that owned the automobile appliance 104. In embodiments, a merchant processor 108 receives an authorization request and passes the request to a consumer payment issuing institution 110. The consumer payment issuing institution 110, in embodiments, is a financial institution that approves transactions for a consumer.

In operation, a consumer may select a service or good provided by the retailer having the retail device 102. For example, the consumer selects a meal at a drive-through. The retail device 102, in embodiments, requires payment. The consumer uses his or her automobile appliance 104 to start a credit or debit transaction. In an embodiment, the consumer starts a mobile wallet application on the automobile appliance 104, which then sends a signal to the retail device 102 by the first communications channel 112 to start the credit or debit transaction. The retail device 102 compiles transaction information. In embodiments, transaction information may be the good or service requested, the amount of payment required, an identifier for the retail device 102, an identifier for the merchant that needs to approve the transaction, and/or one or more other items of information. The transaction information is compiled into a packet of information for transfer over the first communications channel 112 to the automobile appliance 104. In embodiments, the packet of transaction information is encrypted for transmission. The retail device 102 sends the transaction information to the automobile appliance 104. In embodiments, one or more items of the transaction information is sent to the automobile appliance 104 in an unencrypted transmission.

The automobile appliance 104 receives the transaction information. In embodiments, the transaction information is presented to the consumer on the automobile appliance 104 for approval. If approved, the consumer selects a type of payment. For example, the consumer uses an "eWallet" application to select a credit card or debit card. An eWallet application, in embodiments, is an application that allows a user to use his or her credit cards or debit cards electronically without presenting the card. The automobile appliance 104 compiles and appends the payment information to the transaction information received from the retail device 102. The combined information is, in embodiments, encrypted and sent to the retail device 102 and on to the merchant processor 108.

The merchant processor 108 receives the payment and transaction information. In embodiments, the merchant processor 108 compares one or more items of information in both the payment and transaction information to verify the authenticity of the transaction. The merchant processor 108 may then approve the transaction by determining the consumer can pay for the transaction and then issues an authorization. For example, the merchant processor 108 contracts with both the merchant owning the retail device 102 and the consumer owning the automobile appliance 104. The payment information is sent on to the consumer payment issuing institution 110, which authorizes the transaction. In embodiments, the merchant processor 108 sends the authorization to the retail device 102. The retail device 102 can then forward the authorization to the automobile appliance 104. The retailer can complete the transaction by providing the good or service. In embodiments, the retail device 102 can send an electronic receipt to the mobile wallet application 104.

Figure 2A:
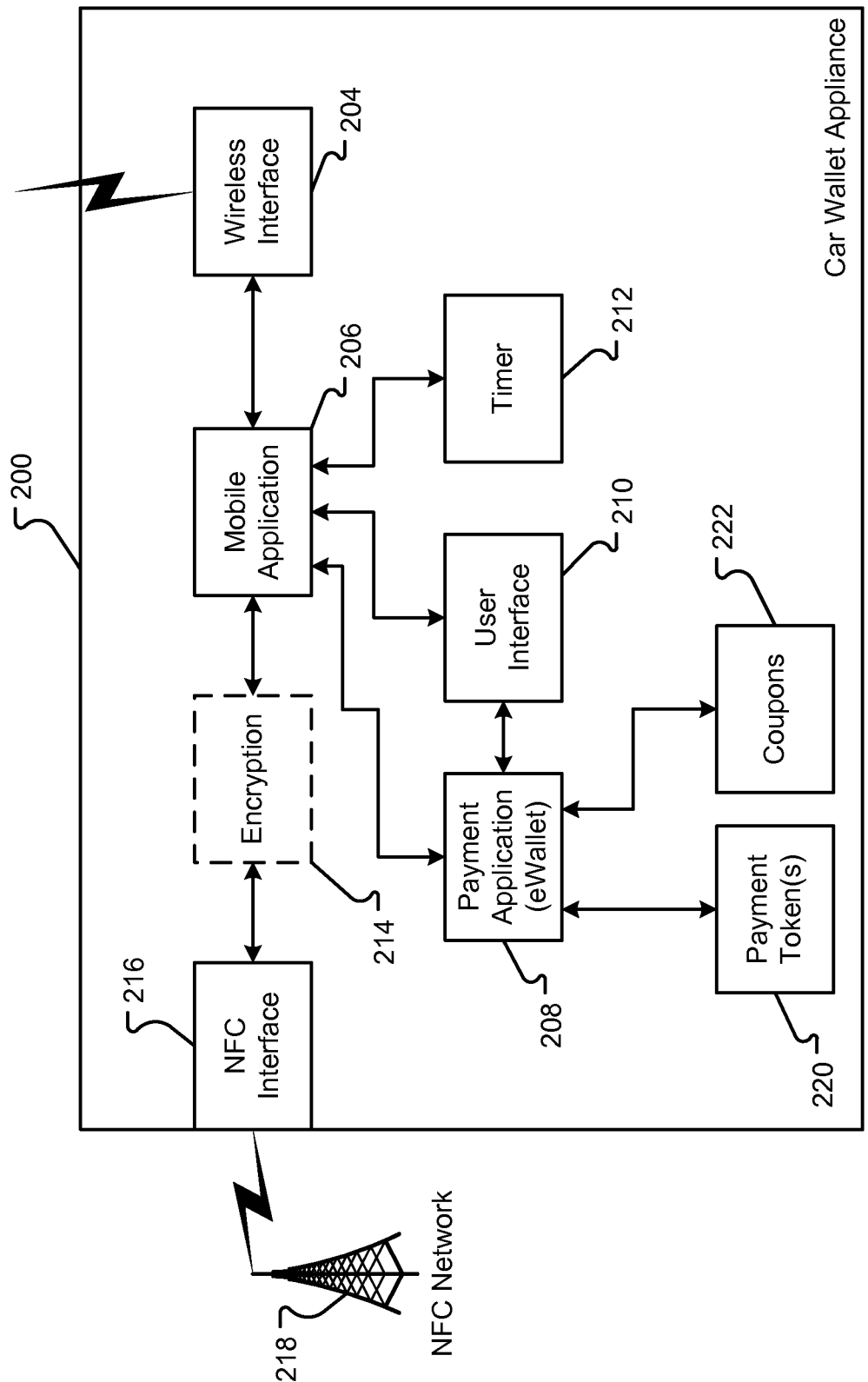
FIG. 2A is a hardware and/or software block diagram of an embodiment of an automobile appliance for use in a system for authorizing contactless payment.

An embodiment of a consumer's automobile appliance 200 is shown in FIG. 2A. In embodiments, the automobile appliance 200 is the same or similar to the automobile appliance 104 (FIG. 1). The automobile appliance 200 comprises one or more of a wireless interface 204, a mobile application 206, an encryption module and/or system 214, a NFC interface 216, a timer 212, a user interface 210, a payment application 208, a payment token 220, and/or a coupons store 222. The wireless interface 204 is a software and/or hardware system that can communicate with a wireless system, for example, a cellular phone system or wireless local area network (LAN). The wireless interface 204, in embodiments, is Bluetooth, infrared, ultraviolet, 802.11g, or other technology. The wireless interface 204 allows the car wallet appliance 200 to communicate with an "autowallet" website to update or modify settings in the car wallet appliance 200.

The encryption module 214, in embodiments, encrypts and/or decrypts communications sent from the automobile appliance 200 or received by the automobile appliance 200. The encryption module 214 may use any encryption method, such as, symmetrical or asymmetrical encryption, public key encryption, PGP or other encryption method that is used by the retail device 102 (FIG. 1) and/or the merchant processor 108 (FIG. 1). In embodiments, the encryption module 214 is optional as represented by the dashed lines.

The automobile appliance 200 further comprises a NFC interface 216, which is operable to communicate with the retailer's retail device 102 (FIG. 1) and then to the merchant processor 108 (FIG. 1). The NFC interface 216 may be any technology or system that can complete communications with the retail device 102 (FIG. 1), such as CDMA, TDMA, GSM, or other cellular technology used by the wireless NFC network 218. In alternative embodiments, the NFC interface 216 is a module or system to communicate over a wireless LAN or WAN. In embodiments, the NFC interface 216 is an NFC compliant device and software for completing NFC communications. For example, the NFC interface 216 comprises a radio frequency identification (RFID) transceiver.

The user interface 210, in embodiments, is a display and/or a device or system to receive user inputs. In embodiments, the user interface 210 is the display in the automobile generally used for displaying maps for a global positioning satellite (GPS) system. For example, the display is an LCD or plasma screen and includes a keyboard or touch screen to receive user inputs. The timer 212 provides a clock for the mobile application 206. The timer may count indefinitely, wherein the mobile application 206 determines differences between two moments in time. In alternative embodiments, the timer 212 executes as a clock that increments to a predetermined number. For example, the timer 212 counts down from 180 seconds to zero seconds or counts up from zero seconds to 180 seconds.

The payment application or "eWallet" application 208 allows a user to pay for retail services using the automobile appliance 200 by electronically providing payment information. The payment information, in embodiments, includes a credit card number, a debit card number, a PIN, an account number, a password, a vehicle identification number (VIN), or other information required to pay for a retail service or good. The information about the consumer's accounts may be in the form of one or more payment tokens 220, which are data structures that store the consumer's information. The payment application 208 can access the payment tokens 220 to obtain information about one or more user accounts. The payment application 208, in embodiments, interacts with the user interface 210 to allow the user to select which account or payment options the user desires. The payment application 208 can then compile payment information that can be forwarded to the retail device 102 (FIG. 1).

In embodiments, the automobile appliance 200 also comprises a mobile application 206. The mobile application 206 is either hardware, software, or both hardware and software that assists the user in completing the transaction. The mobile application 206 receives the transaction information and provides the user interface 210 a display of the information for the user. The user can approve the transaction using the user interface 210. The mobile application 206 may then receive payment information from the payment application 208. In embodiments, the mobile application 206 combines the transaction information and the payment information into a communication sent to the retail device 102 (FIG. 1). The mobile application 206 may set the timer 212 and wait for a response. If the response fails to come before expiration of the timer 212, the mobile application 206 can cancel the transaction. If a decline message is received, the mobile application 206 may cancel the transaction. If the authorization message is received, the retail device 102 (FIG. 1) can complete the transaction and signal the retailer that payment has been received.

Figure 2B:
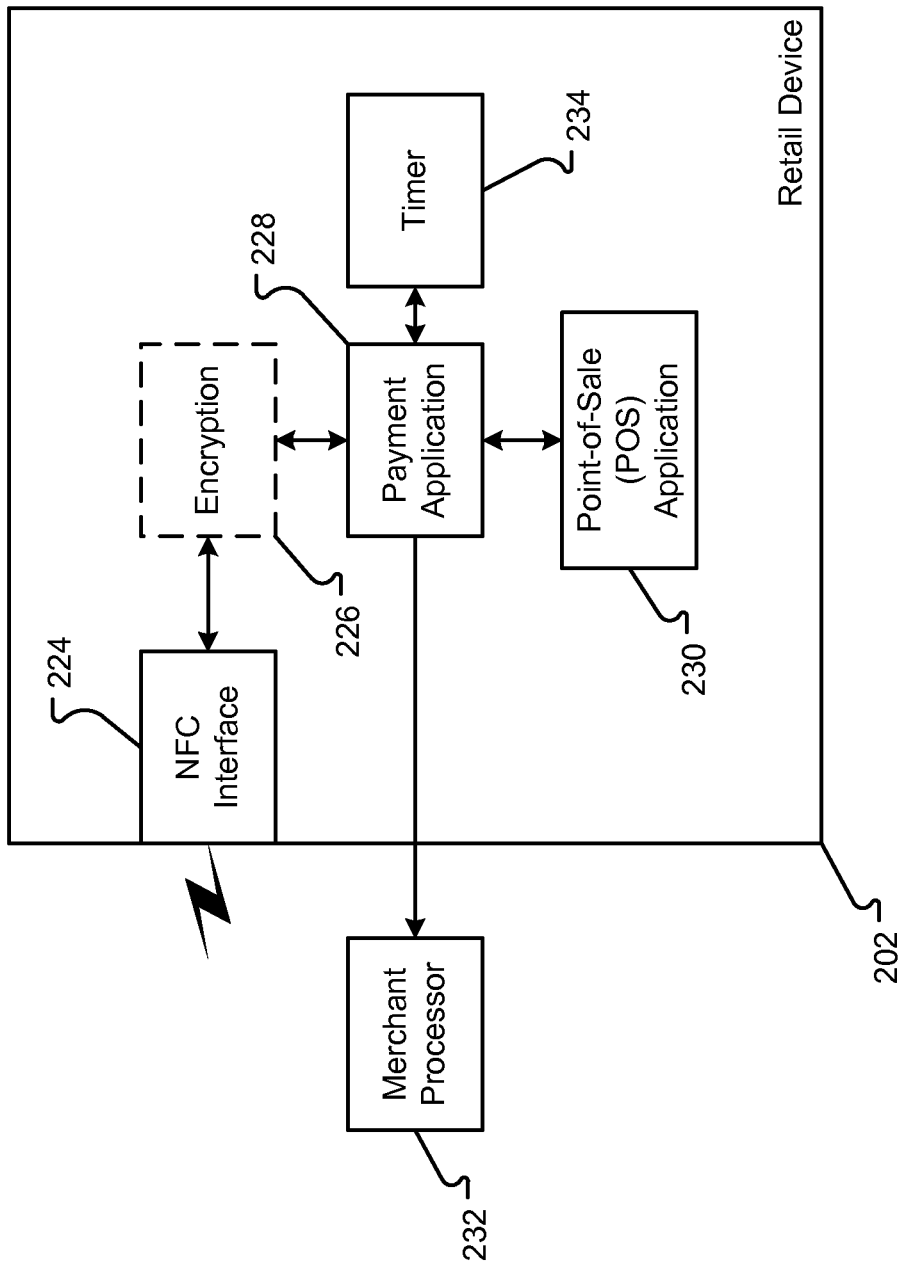
FIG. 2B is a set of hardware and/or software block diagrams of embodiments of a retail device and a merchant processor for use in a system for authorizing contactless payment.

Embodiments of a retail device 202 is shown in FIG. 2B. The retail device 202 comprises one or more of a NFC interface 224, a point-of-sale (POS) application 230, an encryption module and/or system 226, a timer 234, and/or a payment application 228. The NFC interface 224 is a software and/or hardware system that can communicate with an automobile appliance 200 (FIG. 2A). The NFC interface 224, in embodiments, is a NFC compliant interface, which may be Bluetooth®, infrared, ultraviolet, 802.11g, or other technology.

The encryption module 226, in embodiments, encrypts and/or decrypts communications received from or sent to the automobile appliance 200 (FIG. 2A). The encryption module 226 may use any encryption method, such as, symmetrical or asymmetrical encryption, public key encryption, pretty-good-privacy (PGP) or other encryption method that is used by the retail device 202 and/or the merchant processor 108 (FIG. 1). In embodiments, the encryption module 226 is optional as represented by the dashed lines.

The timer 234 provides a clock for the payment application 228. The timer 234 may count indefinitely, wherein the payment application 228 determines differences between two moments in time. In alternative embodiments, the timer 234 executes as a clock that increments to a predetermined number. For example, the timer 234 counts down from 180 seconds to zero seconds or counts up from zero seconds to 180 seconds.

The POS application 230 operates the displays and receives inputs from the retailer for retail services. For example, if the retail device 202 is a drive-through restaurant, the POS module 230 receives retailer inputs 232, such as the selection for the meal, soda, or other item and passes the selection to the payment application. In alternative embodiments, the POS module 230 also determines which type of payment the consumer desires to use, such as cash, credit, debit, etc. The POS module 230 may then pass this payment selection to the payment application 228.

The payment application 228 is either hardware, software, or both hardware and software that completes the transaction for the retail device 202. The payment application 228 receives the selection and possibly payment selection information from the POS module 230. In embodiments, the payment application 228 creates the transaction information into a communication sent over the NFC interface 224 to the automobile appliance 200 (FIG. 2A). The payment application 228 may set the timer 234 and wait for a response. If the response fails to come before expiration of the timer 234, the payment application 228 can cancel the transaction. If a decline message is received, the payment application 228 may cancel the transaction. If the authorization message and payment information is received, the payment application 228 can send the payment information to the merchant processor 232 and wait for a response.

Figure 2C:
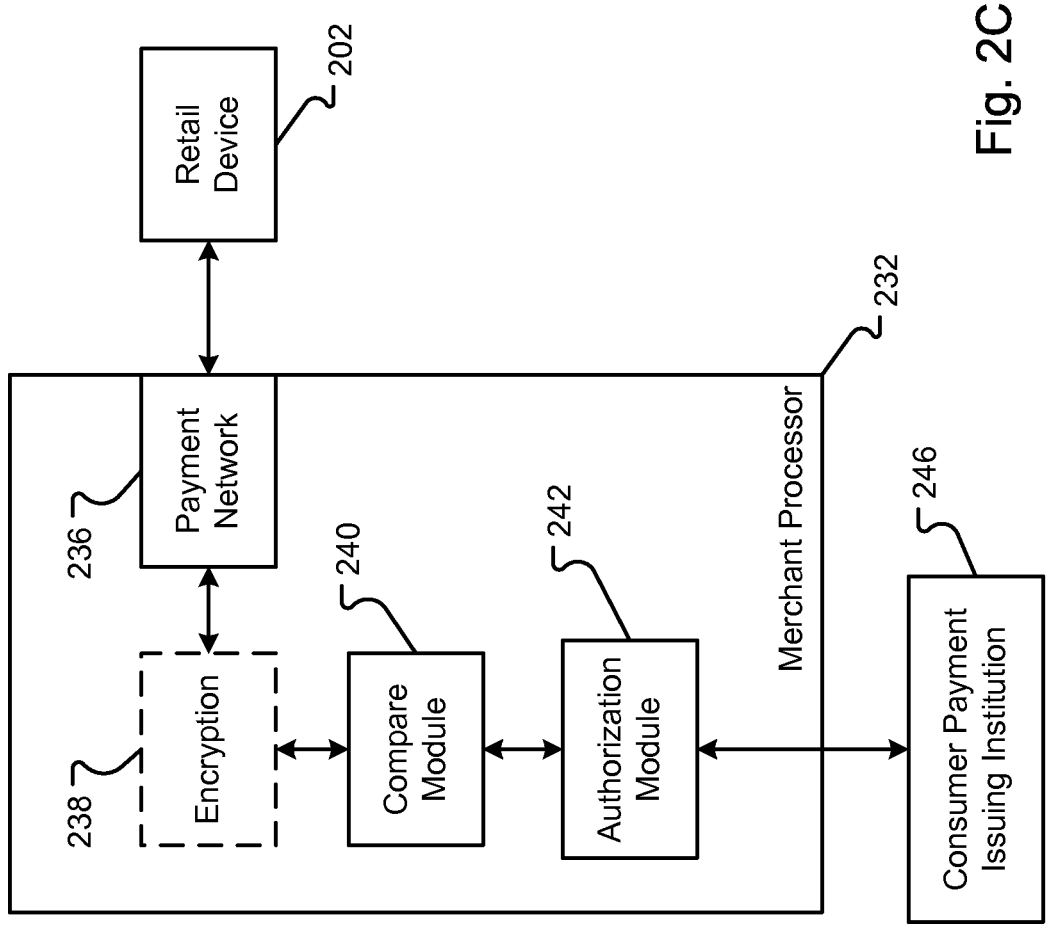
FIG. 2C is a block diagram of an embodiment of a merchant processor for use in a system for authorizing contactless payments.

An embodiment of a merchant processor 232 is shown in FIG. 2C. The merchant processor 232 comprises at least one of an encryption module and/or system 238, a payment network interface 236, a compare module 240, and/or a payment authorization application 242. The encryption module 238, in embodiments, encrypts and/or decrypts communications received from or sent to the retail device 202 (FIG. 2B). The encryption module 238 may use any encryption method, such as, symmetrical or asymmetrical encryption, public key encryption, PGP, or other encryption method that is used by the retail device 202 (FIG. 2B) and/or the automobile appliance 200 (FIG. 2A). In embodiments, the encryption module 238 is optional as represented by the dashed lines.

The payment network interface 236 is operable to communicate with the retail device 202 (FIG. 2B). The payment network interface 236 may be any technology or system that can complete communications with the retail device 202 (FIG. 2B), such as the automated clearing house (ACH) network, a LAN, a wide area network (WAN), the Internet, etc. In alternative embodiments, the payment network interface 236 is a module or system to communicate over a wireless LAN or WAN.

The compare module 240, in embodiments, is a module that compares payment information in the information sent from the automobile appliance 200 (FIG. 2A) with transaction information sent from the retail device 202 (FIG. 2B). The compared information may include one or more of, but is not limited to, the cost of the service or good selected, the type of item or service selected, the amount of services or goods selected, a VIN, or the identifier of the retail device 202 (FIG. 2B). Thus, the compare module 240 is operable to extract this information from the communication from the retail device 202 (FIG. 2B) and compare the information to ensure the authenticity of the transaction. In alternative embodiments, the compare module 240 is part of the consumer payment issuing institution 246. If a compare is unsuccessful, a signal may be sent to the retail device 202 (FIG. 2B) to cancel the transaction.

The authorization module 242 can receive a signal from the compare module 240 that the information in the transaction compares. The authorization module 242 may then approve the transaction using known debit card or credit card authorization techniques. In embodiments, the authorization module 242 creates an authorization message that is sent to the retail device 202 (FIG. 2B) to authorize the transaction. In alternative embodiments, the authorization module 242 verifies the transaction information sent from the retail device 202 (FIG. 2B) but sends both the transaction information and the payment information to the consumer payment issuing institution 246 to authorize the transaction.

One or more data structures used to transport information between the retail device 202 (FIG. 2B), the automobile appliance 200 (FIG. 2A), and/or the merchant processor 232 (FIG. 2B) are shown in FIGS. 3A-E. The one or more data structures, in embodiments, represent packets of information that are communicated using a communication protocol, such as TCP/IP or other protocol. As such, each packet of information may include a header that includes information necessary to transport the packet to the destination, for example, a routing address, encryption information, error codes, etc.

An embodiment of a data structure 300 for transporting transaction information from the retail device 202 (FIG. 2B) to the automobile appliance 200 (FIG. 2A) is shown in FIG. 3A. The data structure 300, in embodiments, includes one or more fields, which may include, but are not limited to, transaction identifier (TID) field 302 and/or a transaction details field 306. The TID field 302 includes an identifier for the transaction being conducted. The TID 302 may include a globally unique identifier (GUID) or other identifier that allows the automobile appliance 200 (FIG. 2A) and the retail device 202 (FIG. 2B) to recognize the transaction.

The transaction details field 308 includes one or more fields containing information about the transaction as shown in FIG. 3B. In embodiments, the transaction details 306 includes at least one of, but is not limited to (as represented by the ellipses 322), an amount field 310, a day field 312, a time field 314, a vendor name field 316, a location field 318, and/or a retailer identifier (RID) field 320. The amount field 310 includes the amount that needs to be paid to complete the transaction. The day field 312 includes the day the transaction occurred. The time field 314 includes the time the transaction occurred. The vendor name field 316 includes the name of the vendor that owns or operates the retail device 202 (FIG. 2B). For example, the vendor name 316 may be the name of the city that is operating the parking meter. The location field 318 includes the location of the retail device 202 (FIG. 2B) and/or the transaction. For example, the location field 318 includes the street address (e.g., 1993 Elm St., Potsdam, N.Y.) where the retailer is located. The RID field 320 provides an identifier for the retailer or vendor that owns or operates the retail device 202 (FIG. 2B). The RID may be a GUID or other identifier that uniquely identifies the vendor. In embodiments, the transaction details 306 can also include the items purchased 319. One or more of these items of data may be displayed on the user interface 210 (FIG. 2A) of the automobile for the consumer.

In embodiments, a data structure 324 for communicating combined payment information and transaction information from the automobile appliance 200 (FIG. 2A) to the retail device 202 (FIG. 2B) is shown in FIG. 3C. Embodiments of the data structure 324 comprise one or more of, but is not limited to, a payee identifier (PID) 326, a payment information field 328, a payment authentication information field 330, a payment details field 332, and/or a transaction information field 334. The transaction information field 334 may include one or more items in the transaction information data structure 300 (FIG. 3A) and may be encrypted. The PID 326 is an identifier for the consumer or the payment instrument (e.g., credit card, debit card, etc.) that the consumer is using. In embodiments, the PID 326 is a GUID or other unique identifier.

Payment information 328 can include information about the payment instrument selected by the consumer. In embodiments, payment information 328 includes one or more of, but is not limited to (as represented by the ellipses 342), an account number field 338 (FIG. 3D) and/or a name field 340 as shown in FIG. 3D. The account number field 338 (FIG. 3D) may include the credit card number, debit card number, or other identifier for the account or financial instrument used by the consumer. In embodiments, the account number 338 includes the VIN for the automobile. The VIN may be used instead of a credit card number and associated with the credit card number at the merchant processor 232 (FIG. 2C). Using the VIN can enhance security of the transaction. The name field 340, in embodiments, includes the consumer's name which is associated with the account being used.

Payment authentication information 330, shown in FIG. 3E, includes information to verify the consumer using the account for payment is authorized to use the account. In embodiments, the payment authentication information 330 includes one or more of, but is not limited to (as represented by the ellipses 352), a payment application information field 346, a mobile user information field 348, and/or a PIN field 350. The payment application information field 346, in embodiments, includes information about the mobile application 206 (FIG. 2A) used by the consumer on the automobile appliance 200 (FIG. 2A). For example, the payment application information field 346 includes the name of the mobile application 206 (FIG. 2A), the version of the mobile application 206 (FIG. 2A), and/or the identifier for the mobile application 206 (FIG. 2A). The mobile user information field 348 can include one or more items of information identifying the consumer's automobile appliance 200 (FIG. 2A), identifying the consumer's automobile, or identifying the consumer using the automobile. For example, the mobile user information field 348 may include the consumer's VIN and/or the consumer's license plate number. The PIN field 350, in embodiments, includes the security PIN 350 for the account listed in the payment information 328. In other embodiments, the PIN 350 is created automatically or manually for each transaction to verify the authenticity of the transaction. For example, the PIN 350 may be an encoded time stamp or other created identifier. In embodiments, the payment details 332 includes one or more of the same information in the transaction details 308 (FIG. 3B). The payment details 332 allow the merchant processor 232 (FIG. 2C) to compare information with the transaction details 308 (FIG. 3B).

Figure 4:
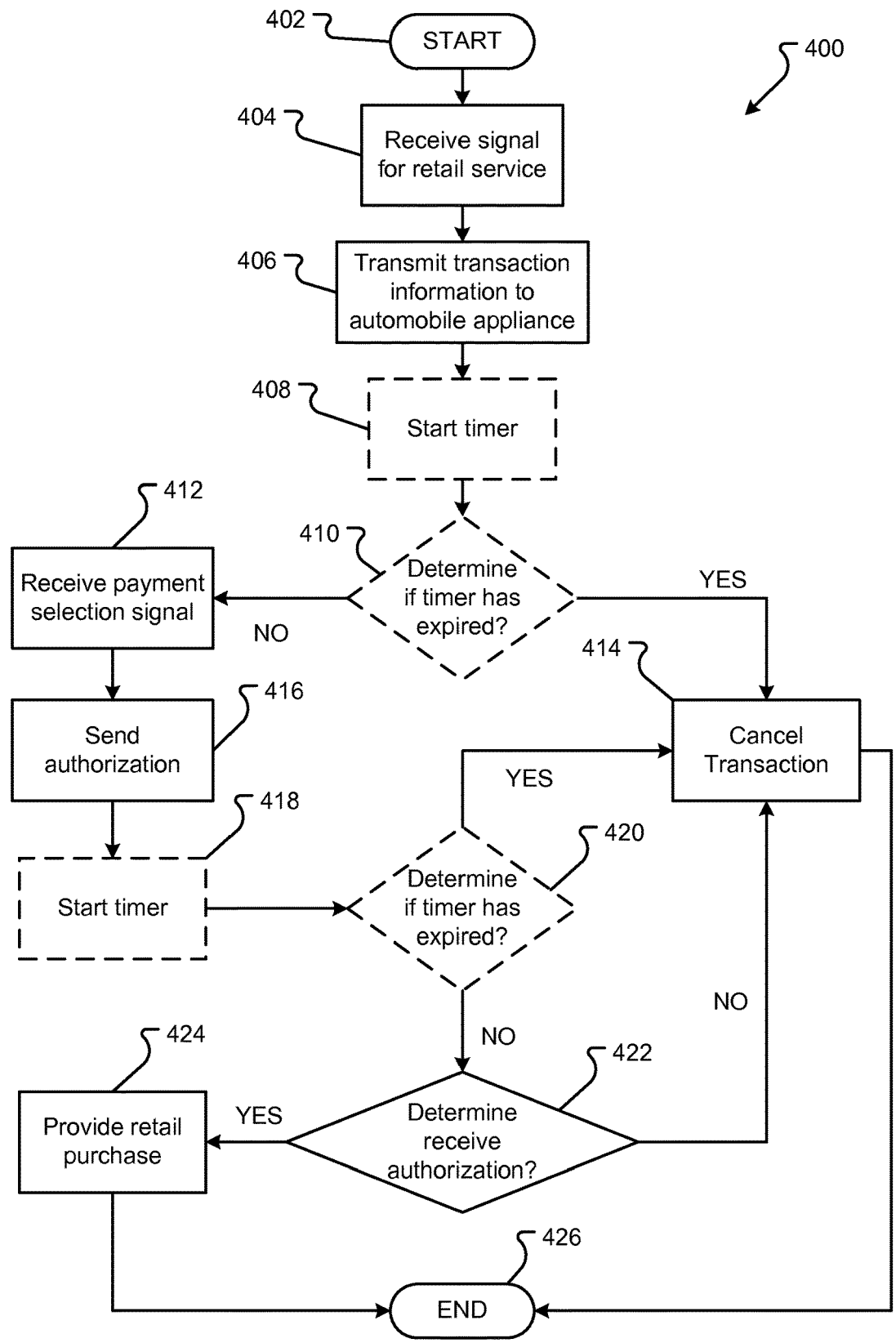
FIG. 4 is a flow diagram of an embodiment of a process for authorizing contactless payment executed at a retail device.

An embodiment of a method 400 executed at a retail device 202 (FIG. 2B) for processing a "contactless" transaction with an automobile appliance 200 (FIG. 2A) is shown in FIG. 4. The transaction is "contactless" in that the retail device 202 (FIG. 2B) does not have to exchange physical credit cards or other payment instruments, but rather relays information between the retail device 202 (FIG. 2B) and the consumer's automobile appliance 104 (FIG. 1). In embodiments, the method 400 generally begins with a START operation 402 and terminates with an END operation 426. The steps shown in the method 400 may be executed in a computer system as a set of computer executable instructions. While a logical order is shown in FIG. 4, the steps shown or described can, in some circumstances, be executed in a different order than presented herein.

Receive operation 404 receives a signal for a retail service or good. In embodiments, a consumer requests and a salesperson selects one or more items or services to purchase. The selection is sent to the POS application 230 (FIG. 2B) of the retail device 202 (FIG. 2B) as consumer input. The POS application 230 (FIG. 2B) receives the selection as the signal for a retail service. This information may be sent from the retail device 202 (FIG. 2B) to the automobile appliance 200 (FIG. 2A) through the NFC network 218 (FIG. 2A) to the NFC interface 216 (FIG. 2A). The mobile application 206 (FIG. 2A) can send at least a portion of the information to the user interface 210 (FIG. 2A) for display to the consumer.

Transmit operation 406 transmits transaction information to the automobile appliance 104 (FIG. 1). In embodiments, after receiving the payment selection, the payment application 228 (FIG. 2B) compiles the transaction information from the POS application 230 (FIG. 2B) and/or one or more other sources into a data packet 300 (FIG. 3). The transaction information may include one or more items shown in data packet 300 (FIG. 3A). In embodiments, the payment application 228 (FIG. 2B) has one or more portions of the data packet 300 (FIG. 3A) encrypted by the encryption module 226 (FIG. 2B). The data packet 300 (FIG. 3A) is then forwarded to the NFC interface 224 (FIG. 2B), which transmits the data packet 300 (FIG. 3A) to the automobile appliance 200 (FIG. 2A).

Optional start operation 408 starts a timer. In some embodiments, the payment application 228 (FIG. 2B) starts the timer 234 (FIG. 2B) at the time that the data packet 300 (FIG. 3A) is transmitted to the automobile appliance 200 (FIG. 2A). As explained with FIGS. 2A and 2B, the timer 234 (FIG. 2B) may count down for a predetermined amount of time, for example, 180 seconds.

Optional determine operation 410 determines if the timer has expired. In embodiments, the payment application 228 (FIG. 2B) monitors the timer 234 (FIG. 2B). If the timer 234 (FIG. 2B) reaches zero (0) or the predetermined amount of time, the method flows YES to cancel operation 414. If the payment application 228 (FIG. 2B) receives a payment signal before the timer 234 (FIG. 2B) reaches zero (0) or the predetermined amount of time, the method flows NO to receive operation 412. Cancel operation 414 cancels the transaction. In embodiments, after the timer 234 (FIG. 2B) expires, the payment application 228 (FIG. 2B) cancels the transaction by signaling the POS application 230 (FIG. 2B) not to provide the retail service or good. The POS application 230 (FIG. 2B) may inform the automobile appliance 200 (FIG. 2A) that the transaction was cancelled because of a time out. The use of the timer 234 (FIG. 2B) ensures that transactions are not maintained when communication difficulties prevent receipt of the authorization.

Receive operation 412 receives a payment selection signal. The POS application 230 (FIG. 2B) responds to the selection signal by acquiring what payment method the consumer desires to use, e.g., cash or credit. For example, the automobile appliance 200 (FIG. 2A) displays a message to the consumer on the user interface 210 (FIG. 2A) that asks for a payment selection. The consumer uses the user interface 210 (FIG. 2A) on the automobile appliance 200 (FIG. 2A) to select the payment type. The automobile appliance 200 (FIG. 2A) sends the payment information over the NFC interface 216 (FIG. 2A) back to the retail device 202 (FIG. 2B). The retail device 202 (FIG. 2B) receives the input and sends the payment information to the payment application 228 (FIG. 2B). In embodiments, the consumer selects a payment type using an eWallet 208 (FIG. 2A) or other credit or debit account or system. In embodiments, the payment application 228 (FIG. 2B) appends the received payment information to the transaction information 300 (FIG. 3A) to create data packet 324 (FIG. 3C).

Send operation 416 sends the appended payment information and transaction information. In embodiments, the payment application 228 (FIG. 2B) forwards the new data packet 324 (FIG. 3C) to the merchant processor 232 (FIG. 2B). The merchant processor 232 (FIG. 2B) can review the payment information 324 (FIG. 3C) and request authorization from the consumer payment issuing institution 110 (FIG. 1). The payment application 228 (FIG. 2B) waits for the authorization from the merchant processor 232 (FIG. 2B).

Optional start operation 418 starts a timer. In some embodiments, the payment application 228 (FIG. 2B) starts the timer 234 (FIG. 2B) at the time that the data packet 324 (FIG. 3C) is transmitted to the merchant processor 232 (FIG. 2B). As explained with FIGS. 2A and 2B, the timer 234 (FIG. 2B) may count down for a predetermined amount of time, for example, 180 seconds.

Optional determine operation 420 determines if the timer has expired. In embodiments, the payment application 228 (FIG. 2B) monitors the timer 234 (FIG. 2B). If the timer 234 (FIG. 2B) reaches zero (0) or the predetermined amount of time, the method flows YES to cancel operation 414. If the payment application 228 (FIG. 2B) receives a signal from the merchant processor 232 (FIG. 2B) before the timer 234 (FIG. 2B) reaches zero (0) or the predetermined amount of time, the method flows NO to determine operation 422.

Determine operation 422 determines if an authorization or a decline message is received from the merchant processor 232 (FIG. 2B). The payment application 228 (FIG. 2B) interprets the authorization message as allowing the transaction and sends a signal to the POS application 230 (FIG. 2B) to dispense the retail good(s) or provide the retail service(s).

In an alternative embodiment, the retail device 202 (FIG. 2B) receives a decline message, which means that the merchant processor 232 (FIG. 2B) did not approve the transaction. The payment application 228 (FIG. 2B) then interprets the decline message as not allowing the transaction. The method 400 then flows to cancel operation 414 and the payment application 228 (FIG. 2B) sends a signal to the POS application 230 (FIG. 2B) not to dispense the retail good(s) or not to provide the retail service(s). If the good(s) or service(s) are not provided, the POS application 230 (FIG. 2B) may inform the automobile appliance 200 (FIG. 2A) that the transaction was declined.

Provide operation 424 provides the good(s) or service(s). In embodiments, the POS application 230 (FIG. 2B) responds to the authorization signal from the payment application 228 (FIG. 2B) by providing the good(s) or service(s).

Figure 5A:
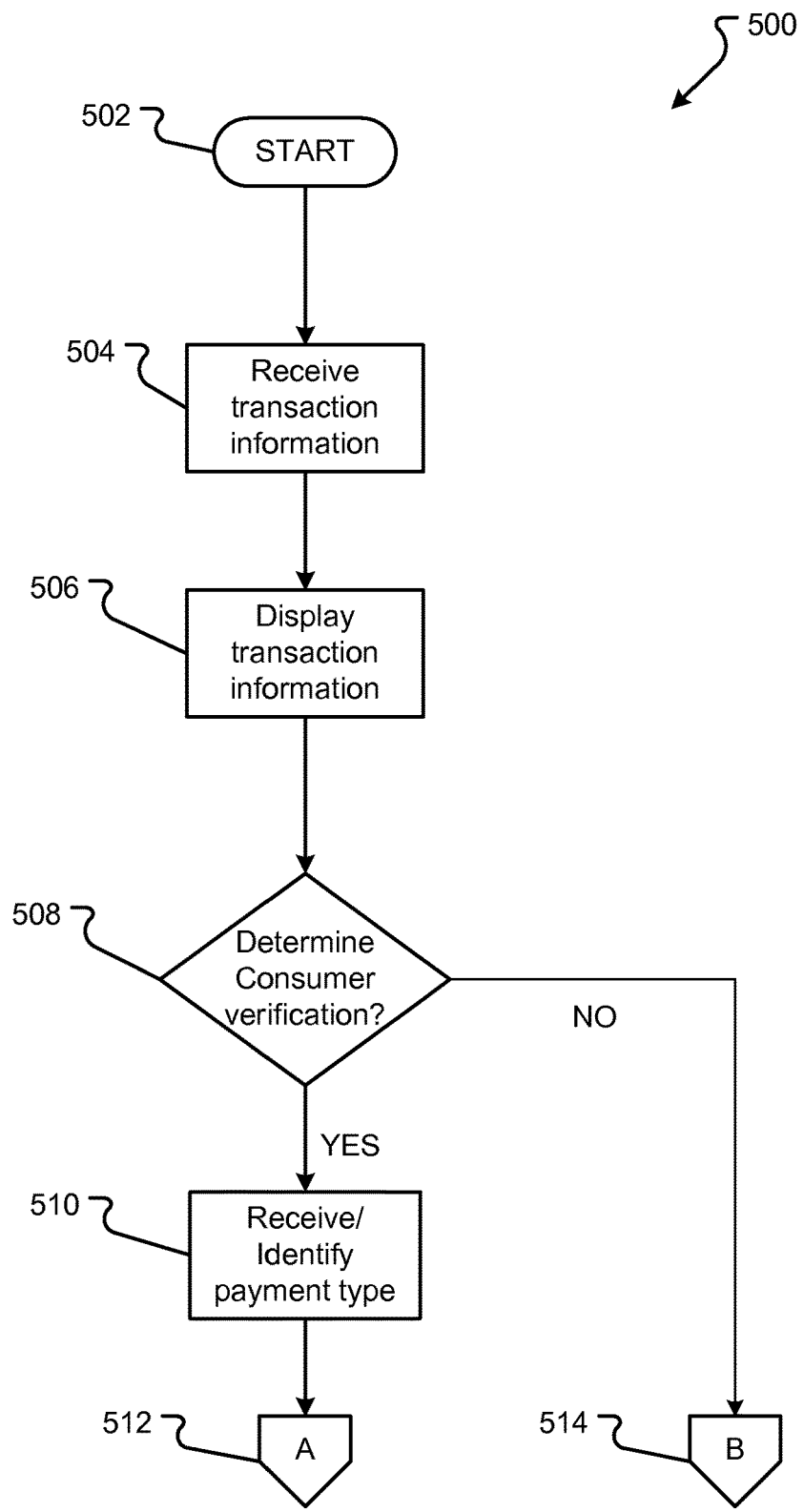
FIGS. 5A-B are flow diagrams of an embodiment of a process for authorizing contactless payment executed at an automobile appliance.
Figure 5B:
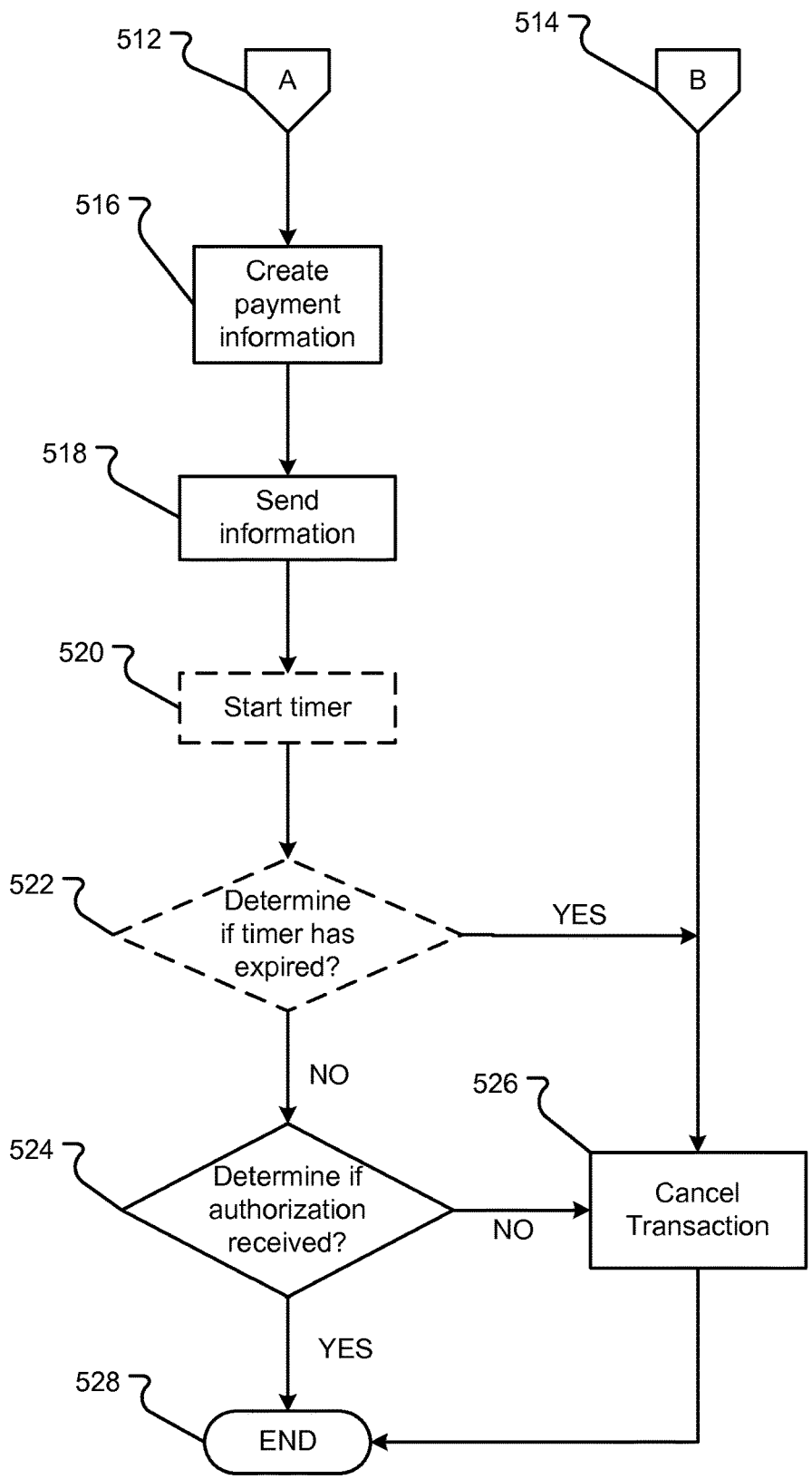

An embodiment of a method 500 executed at a automobile appliance 200 (FIG. 2A) for processing contactless transactions is shown in FIG. 5A and FIG. 5B. In embodiments, the method 500 generally begins with a START operation 502 and terminates with an END operation 536. The steps shown in the method 500 may be executed in a computer system as a set of computer executable instructions. While a logical order is shown in FIGS. 5A and 5B, the steps shown or described can, in some circumstances, be executed in a different order than presented herein. Page connector A 518 and connector B 520 continue the flow of the method 500 from FIG. 5A to FIG. 5B.

Receive operation 504 receives transaction information from the retail device 202 (FIG. 2B). In embodiments, the NFC interface 216 (FIG. 2A) receives the transaction information packet 300 (FIG. 3A). One or more items of information in the transaction information packet 300 (FIG. 3A) may be encrypted and need decryption. The wireless interface 216 (FIG. 2A) can send the transaction information packet 300 (FIG. 3A) or portions thereof to the encryption module 214 (FIG. 2A) for decryption.

Display operation 506 displays one or more portions of the transaction information. In embodiments, the automobile appliance 200 (FIG. 2A) sends one or more portions of the transaction information to the user interface 210 (FIG. 2A). The user can view the transaction information on the user interface 210 (FIG. 2A). In embodiments, a user can verify or approve the transaction using the user interface 210 (FIG. 2A). For example, the user interface 210 (FIG. 2A) may display or include a button, icon, or other device, which, if selected by a user action, provides an approval signal to the automobile appliance 200 (FIG. 2A).

Determine operation 508 determines if the user verifies the transaction information. In embodiments, the mobile application 206 (FIG. 2A) determines if the user interface 210 (FIG. 2A) received the approval signal from user interaction with the user interface 210 (FIG. 2A). In other embodiments, the mobile application 206 (FIG. 2A) determines if the user interface 210 (FIG. 2A) received a decline signal from user interaction with another button, icon, or other device on the user interface 210 (FIG. 2A). If the user verifies the transaction information, the method 500 flows YES to receive operation 510. If the user does not verify the transaction information, the method 500 flows NO through off-page connector B 514 to cancel operation 526. Cancel operation 526 cancels the transaction. In embodiments, the mobile application 206 (FIG. 2A) cancels further processing of the transaction by the automobile appliance 200 (FIG. 2A) and sends a decline signal or message to the retail device 202 (FIG. 2B). In embodiments, the retail device 202 (FIG. 2B) cancels the transaction.

Receive operation 510 identifies a payment type. In embodiments, the mobile application 206 (FIG. 2A) inquires of the payment application or eWallet 208 (FIG. 2A) which payment type the user desires. The payment application 208 (FIG. 2A), in embodiments, retrieves one or more items of information from the payment tokens 220 (FIG. 2A) and sends the information or a display for rendering to the user interface 210 (FIG. 2A). In other embodiments, the payment application 208 (FIG. 2A) automatically sends the information to the user interface 210 (FIG. 2A) without an inquiry from the mobile application 206 (FIG. 2A). The user interface 210 (FIG. 2A) can display the information and request the user to select a payment type. A payment type may be a selection of electronic account, electronic credit card, electronic debit card, etc. The user interface 210 (FIG. 2A), in embodiments, receives the selection of payment type and signals the payment application 208 (FIG. 2A) which payment type has been selected. The method 500 then flows through off-page connector A 512 to FIG. 5B. In embodiments, the user may also be presented with one or more coupons from the coupon store 222 (FIG. 2A). The user may select a coupon to apply to the transaction.

Create operation 516 creates payment information. In embodiments, the payment application 208 (FIG. 2A) reads one or more items of information from the payment token 220 (FIG. 2A) associated with the payment type selected by the user. The payment information in the payment token 220 (FIG. 2A) is sent to the mobile application 206 (FIG. 2A). The mobile application 206 (FIG. 2A) creates a new data packet 324 (FIG. 3C), which includes transaction information 334 (FIG. 3C) that includes at least a portion of the transaction information 300 (FIG. 3A) received from the retail device 202 (FIG. 2B). The new data packet 324 (FIG. 3C) also includes one or more portions of the payment information received from the payment application 208 (FIG. 2A). In embodiments, one or more portions of the new data packet 324 (FIG. 3C) may be sent to the encryption module 214 (FIG. 2A) to be encrypted.

Send operation 518 sends the appended payment information and transaction information 324 (FIG. 3C). In embodiments, the mobile application 206 (FIG. 2A) forwards the new data packet 324 (FIG. 3C) to the NFC interface 216 (FIG. 2A) to send to the retail device 202 (FIG. 2A). The NFC interface 216 (FIG. 2A) can then transmit the new data packet 324 (FIG. 3C) over the NFC network 218 (FIG. 2A) bound for the retail device 202 (FIG. 2B). In alternative embodiments, the mobile application 206 (FIG. 2A) responds to a signal from the NFC interface 216 (FIG. 2A) that no signal is present for the NFC network 218 (FIG. 2A), that is, the new data packet 324 (FIG. 3C) cannot be sent. The mobile application 206 (FIG. 2A) may then queue the new data packet 324 (FIG. 3C) for later transmission, inform the consumer on the user interface 210 (FIG. 2A), or cancel the transaction.

Optional start operation 520 starts a timer. In some embodiments, the mobile application 206 (FIG. 2A) starts the timer 212 (FIG. 2A) at the time that the new data packet 324 (FIG. 3C) is transmitted to the retail device 202 (FIG. 2B). As explained with FIGS. 2A and 2B, the timer 212 (FIG. 2A) may count down for a predetermined amount of time, for example, 180 seconds.

Optional determine operation 522 determines if the timer has expired. In embodiments, the mobile application 206 (FIG. 2A) monitors the timer 212 (FIG. 2A). If the timer 212 (FIG. 2A) reaches zero (0) or the predetermined amount of time, the method flows YES to cancel operation 526. If the mobile application 206 (FIG. 2A) receives an authorization or decline message before the timer 212 (FIG. 2A) reaches zero (0) or the predetermined amount of time, the method flows NO to determine operation 524. Cancel operation 526 cancels the transaction. In embodiments, after the timer 212 (FIG. 2A) expires, the mobile application 206 (FIG. 2A) cancels the transaction by sending a decline message to the retail device 202 (FIG. 2B) to not provide the retail service or good. The mobile application 206 (FIG. 2A) may also inform the consumer that the transaction was cancelled because of a time out by displaying a message in the user interface 210 (FIG. 2A). The use of the timer 212 (FIG. 2A) ensures that transactions are not maintained when communication difficulties prevent receipt of the authorization.

Determine operation 524 determines if an authorization or decline message is received. In embodiments, the automobile appliance 200 (FIG. 2A) receives the authorization message from the retail device 202 (FIG. 2B). The mobile application 206 (FIG. 2A) may understand the message is an authorization and display an authorization indication in the user interface 210 (FIG. 2A).

In an alternative embodiment, the mobile application 206 (FIG. 2A) receives a decline message, which means that the merchant processor 232 (FIG. 2B) did not approve the transaction. The mobile application 206 (FIG. 2A) may interpret the decline message as not allowing the transaction and sends a signal to the user interface 210 (FIG. 2A) indicating that the transaction was not authorized.

Figure 6:
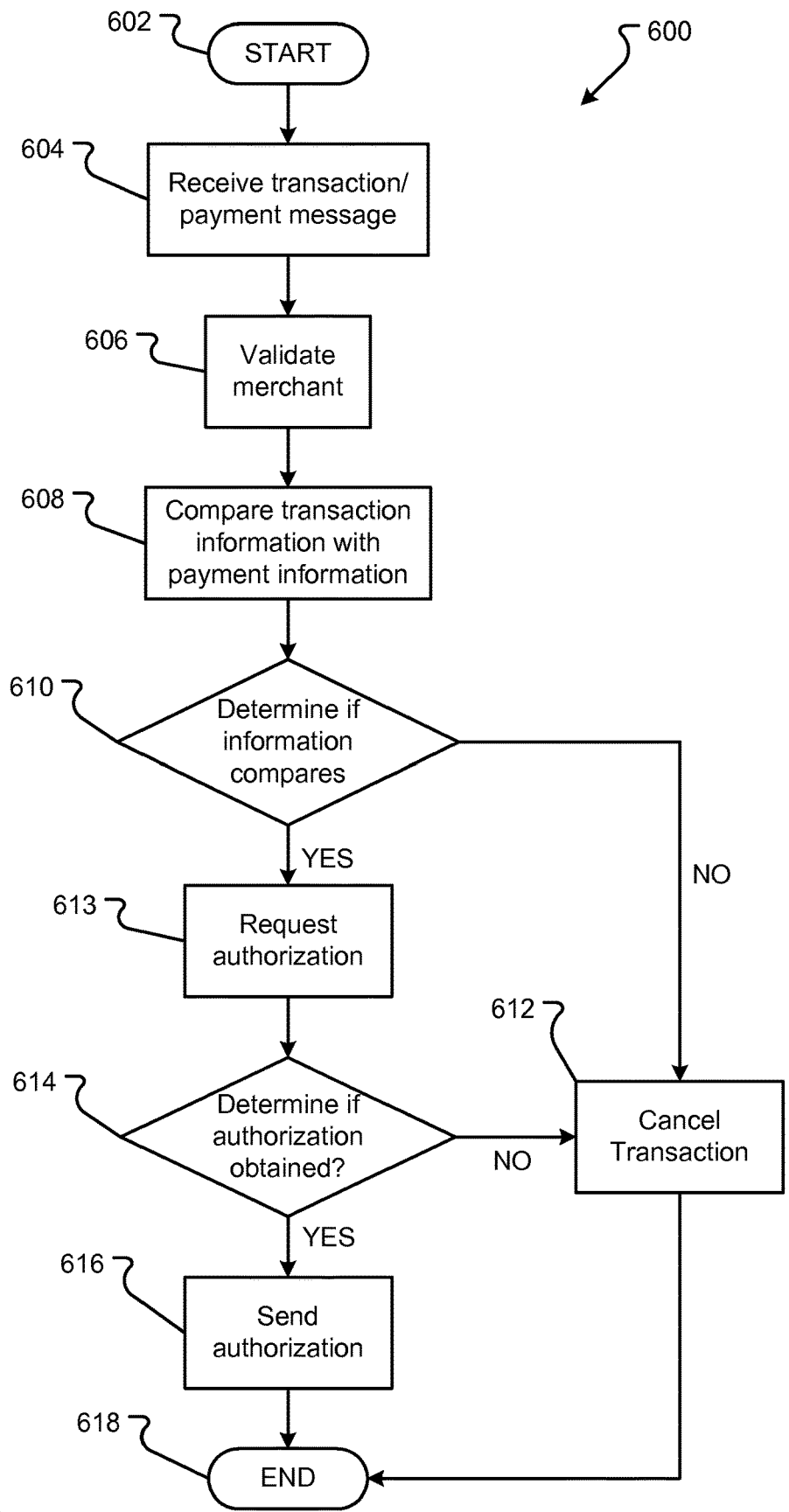
FIG. 6 is a flow diagram of an embodiment of a process for authorizing contactless payment executed at a merchant processor.

An embodiment of a method 600 executed at merchant processor 232 (FIG. 2B) for processing a contactless transaction is shown in FIG. 6. In embodiments, the method 600 generally begins with a START operation 602 and terminates with an END operation 618. The steps shown in the method 600 may be executed in a computer system as a set of computer executable instructions. While a logical order is shown in FIG. 6, the steps shown or described can, in some circumstances, be executed in a different order than presented herein.

Receive operation 604 receives payment and transaction information from the retail device 202 (FIG. 2B). In embodiments, the payment network interface 236 (FIG. 2C) receives the information packet 324 (FIG. 3C). One or more items of information in the information packet 324 (FIG. 3C) may be encrypted. The payment network interface 236 (FIG. 2C) can send the information packet 324 (FIG. 3C) or portions thereof to the encryption module 238 (FIG. 2C) for decryption. In embodiments, one or more portions of the information packet 324 (FIG. 3C) are not decrypted because the merchant processor 232 (FIG. 2B) does not contract with the consumer and, thus, does not have the keys or other information to decrypt the portions of the payment information. The decrypted portions of the information packet 324 (FIG. 3C) are then sent to the compare module 240 (FIG. 2C).

Validate operation 606 validates the retailer. The compare module 240 (FIG. 2C) first determines, using the RID 320 (FIG. 3B) or other information, if the retailer owning the retail device 202 (FIG. 2B) has contracted with the merchant processor 232 (FIG. 2B). If the retailer does not contract with the merchant processor 232 (FIG. 2B), the transaction may be cancelled. However, if the retailer does contract with the merchant processor 232 (FIG. 2B), the method flows to the compare operation 608.

Compare operation 608 compares one or more portions of the transaction information or payment information with known stored information. In embodiments, the compare module 240 (FIG. 2C) compares at least one item in the payment details 332 (FIG. 3C) with at least one item in the transaction details 308 (FIG. 3B). The compare module 240 (FIG. 2C) may compare the items selected, the price of the transaction, the number of items selected, the MID, etc. In another embodiment, the compare module 240 (FIG. 2C) compare the VIN with a VIN stored at the merchant processor 232 (FIG. 2B). If the VINs compare, the merchant processor 232 (FIG. 2B) can authorize the transaction.

Determine operation 610 determines if the one or more items compares. In embodiments, the compare module 240 (FIG. 2C) makes the determination. If the one or more items do compare, the method flows YES to request operation 613. If the one or more items do not compare, the method flows NO to cancel operation 612. Cancel operation 612 cancels the transaction. In embodiments, the compare module 240 (FIG. 2C) sends a decline message to the payment network interface 236 (FIG. 2C) to forward to the retail device 202 (FIG. 2B) to cancel the transaction.

Request operation 613 requests authorization for the transaction. In embodiments, the authorization module 242 (FIG. 2C) of the merchant processor 232 (FIG. 2B) authorizes the transaction using known methods for approving credit card, debit card, or other account transactions. In other embodiments, the authorization module 242 (FIG. 2C) requests and receives approval for the transaction from a consumer payment issuing institution 246 (FIG. 2C). If the transaction is not approved, the authorization module 242 (FIG. 2C) receives or generates a decline message.

Determine operation 614 determines if an authorization or decline message is received. In embodiments, the merchant processor 232 (FIG. 2B) receives the authorization message from the consumer payment issuing institution 246 (FIG. 2C). The merchant processor 232 (FIG. 2B) may understand the message is an authorization or a declination.

Send operation 616 sends the authorization or decline message. In embodiments, the authorization module 242 (FIG. 2C) sends the authorization or decline message to the payment network interface 236 (FIG. 2C). The payment network interface 236 (FIG. 2C) can transmit or send the authorization or decline message to the retail device 202 (FIG. 2B), which may then forward the authorization or decline message to the automobile appliance 200 (FIG. 2A).

Figure 7:
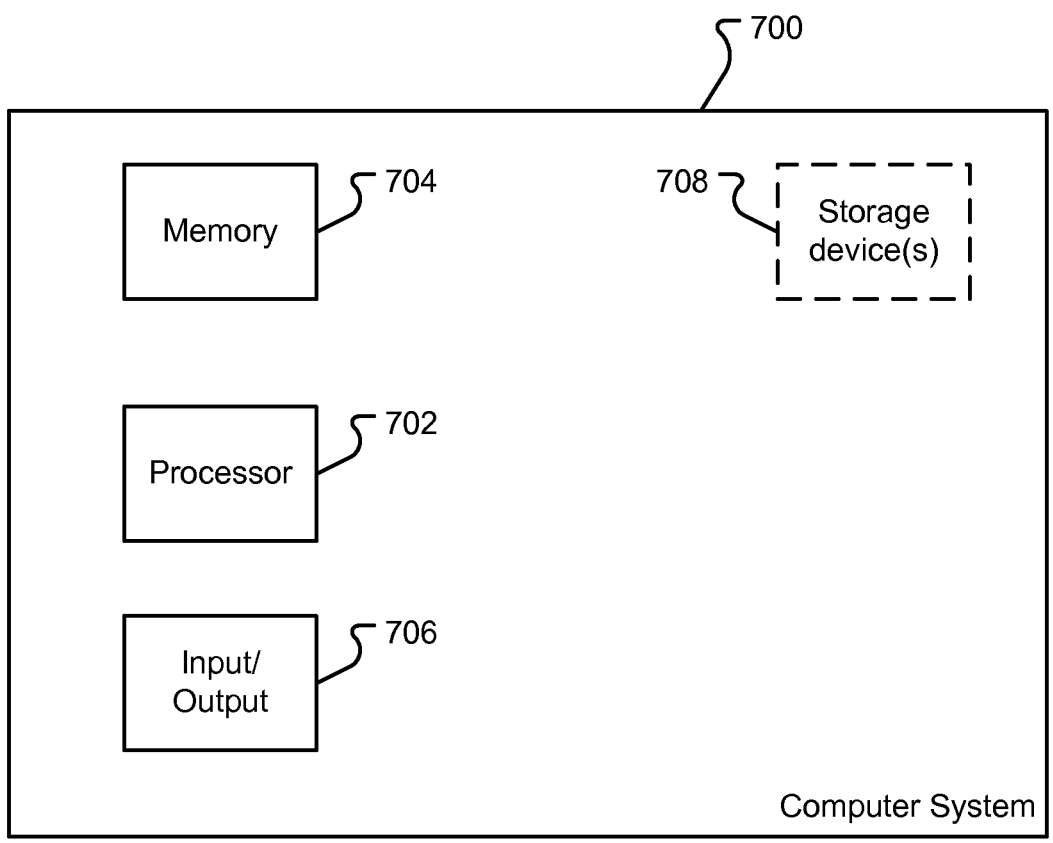
FIG. 7 is a block diagram of an embodiment of a computer system for use in the system for authorizing contactless payments.

Embodiments of the different systems represented in this disclosure, which may include the merchant processor 232 (FIG. 2B), the automobile appliance 200 (FIG. 2A), the retail device 202 (FIG. 2B), and/or the issuing institution 246 (FIG. 2B) may be a computer system, such as computer system 700 shown in FIG. 7. A basic computer system is shown as one skilled in the art will recognize the technical changes and modifications that may be used to make the systems described herein operable. The computer system 700 comprises a processor 702, which completes the operations described in conjunction with FIGS. 4 through 7 or makes the systems operable described in conjunction with FIGS. 1 through 2B. The processor 702 may be any type of processor operable to complete the operations or implement the systems described herein. For example, the processor 702 may be an Intel Pentium processor, an ASIC, an FPGA, or other device.

The computer system 700 also comprises memory 704 to hold data or code being executed by processor 702. The memory 704 may permanently or temporarily store the instructions described in conjunction with FIGS. 4 through 6 or the data elements described in conjunction with FIG. 3. Memory may be classified as computer-readable medium, for example, RAM, ROM, magnetic media, optical media, etc.

The computer system 700 also can comprise software elements, including an operating system and/or other code, such as one or more application programs for authorizing payments at any of the merchant processor 232 (FIG. 2B), the automobile appliance 200 (FIG. 2A), the retail device 202 (FIG. 2B), and/or the issuing institution 246 (FIG. 2C). The application programs may comprise computer programs described herein, and/or may be designed to implement methods described herein and/or configure systems described herein. Merely by way of example, one or more procedures described with respect to the method(s) discussed in conjunction with FIGS. 4-6 might be implemented as code and/or instructions executable by the computer system 700 (and/or the processor 702 within the computer system 700).

A set of these instructions and/or code might be stored on a computer readable storage medium, such as the storage device(s) 708 or memory 704. In some cases, the storage medium might be incorporated within a computer system. In other embodiments, the storage medium might be separate from a computer system (i.e., a removable medium, such as a compact disc, etc.), and/or provided in an installation package, such that the storage medium can be used to program a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

Further embodiments of the computer system 700 comprises input/output (I/O) modules of systems 706. I/O systems 706 may include displays such as LCDs, plasma screen, cathode ray tubes, etc. The displays can provide a visual representation of data to a user. I/O system 706 may also include input devices such as mice, keyboards, touch screens, etc. Input devices allow the user to input information into the computer system. I/O systems 706 may also comprise communication systems such as wired, wireless, or other communication systems. Further, communication systems may communicate with peripheral devices, such as printers, modems, or other devices.

In light of the above description, a number of advantages of the present disclosure are readily apparent. For example, the systems allow for transaction with retail devices that have no connectivity to a merchant processor. Thus, a technical solution is provided of connecting through a consumer's automobile appliance using new hardware and/or software in the automobile appliance, retail device, and/or merchant processor to effectuate the communication of information from the retail device to the merchant processor. As such, no cellular or mobile transmitter is needed in each retail device, which saves a great deal of expense for the merchant. Further, the retail devices may be deployed in remote locations and still operate to receive credit or debit transactions. Still further, the retail device leverages the consumer's automobile appliance to send the information needed to receive the credit or debit authorization. As such, the merchant saves the enormous expense of opening cellular phone accounts for each retail device and sending numerous messages from each retail device.

A number of variations and modifications of the disclosure can also be used. For example, the retail device may interact with an automobile appliance at a first location, e.g., the ordering kiosk, when the person orders. The retail device may send transaction information to the automobile appliance during or soon after the ordering of the retail good or service. The automobile appliance can store the transaction information and suspend the transaction. Then, at a second location, e.g., the drive-through window, the retail device and the automobile appliance can resume the transaction and interact again. During the suspension of the transaction, the consumer could determine the payment type. Then, in response to resuming the transaction, the automobile appliance may send the payment information to the retail device. In this way, the transaction is even faster as the consumer makes selections during a time when the transaction is not progressing, i.e., when traveling from the first location to the second location.

In still another embodiment, the system could effectuate automobile-to-bank transaction. For example, a consumer could enter a bank drive-through. The user could use the user interface in the car to make withdrawals, deposits, or other transactions with the bank. This application becomes useful during bad weather or when a consumer's vehicle makes it difficult to use an external system, e.g., a window that does not open.

The embodiments presented herein have several advantages. The processing of transaction with an automobile can be further accelerated. The consumer need not present a physical card from the car or sign an authorization. Further, the consumer need not pass an RFID device. Rather, the user can conduct the transaction quickly from the automobile. Further, the consumer need not use any other device outside the comfort of the consumer's car.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

While the principles of the disclosure have been described above in connection with specific apparatuses and methods, it is to be clearly understood that this description is made only by way of example and not as limitation on the scope of the disclosure.

What is claimed is:

1. A system, comprising:
   an automobile appliance integrated into an automobile for completing a transaction with a retail device, the automobile appliance comprising:
      at least one first memory configured to store computer-executable instructions;
      a wireless communications device, the wireless communications device operable to transmit a request for a transaction to the retail device, receive transaction information associated with the transaction from the retail device, transmit payment information comprising a vehicle identification number (VIN) of the automobile and the transaction information to the retail device, and receive an authorization for the transaction; and
      at least one first processor in communication with a user interface of the automobile and the wireless communications device and configured to access the at least one first memory and execute the computer-executable instructions to:
         generate a request for the transaction;
         provide the request to the wireless communications device for transmission to the retail device;
         receive, from the wireless communications device responsive to providing the request for the transaction, the transaction information;
         provide the transaction information to a consumer on the user interface in the automobile;
         receive, from the consumer, a selection of a payment account for the transaction;
         retrieve the VIN associated with the payment account for use within payment information in lieu of an identifier of the payment account; and
         provide the payment information comprising the VIN and the transaction information to the retail device via the wireless communications device; and
   a merchant processor in communication with the retail device, the merchant processor comprising:
      at least one second memory configured to store additional computer-executable instructions; and
      at least one second processor configured to access the at least one second memory and execute the additional computer-executable instructions to:
         receive the payment information comprising the VIN associated with the payment account in lieu of an identifier of the payment account from the retail device;
         compare a stored VIN at the merchant processor and the VIN received within the payment information; and
         provide the authorization for the transaction for delivery to the automobile appliance upon a match between the stored VIN and the VIN received with the payment information,
   wherein the at least one first processor of the automobile appliance receives, via the wireless communications device, the authorization for the transaction, wherein the authorization indicates that the payment account associated with the VIN has been approved by the merchant processor; and
   displays the authorization in the user interface in the automobile.

2. The system as defined in claim 1, wherein the at least one first processor is further configured to execute the computer-executable instructions to: encrypt, in an encryption module, the payment information before providing the payment information comprising the VIN and transaction information to the retail device.

3. The system as defined in claim 1, wherein the retail device is associated with a banking system and the transaction information relates to a banking transaction.

4. The system as defined in claim 1, wherein the wireless communications device is one of a radio frequency (RF), near field communication (NFC), Bluetooth, infrared, ultraviolet, or 802.11g device.

5. The system as defined in claim 1, wherein the at least one first processor is further configured to execute the computer-executable instructions to: create, the payment information.

6. The system as defined in claim 5, wherein the at least one first processor is further configured to execute the computer-executable instructions to: provide the payment information to the user interface in the automobile for display to the consumer.

7. The system as defined in claim 6, wherein the at least one first processor is further configured to execute the computer-executable instructions to: receive, via the user interface, a signal representing the consumer's acceptance of the payment information.

8. The system as defined in claim 2, wherein the encryption module encrypts the transaction information using symmetrical encryption, asymmetrical encryption, public key encryption, or pretty good privacy (PGP) encryption.

9. One or more computer program product embodied in one or more computer readable media having instructions stored thereon that, when execute by one or more automobile appliance processors or one or more merchant processors, cause the one or more automobile appliance processors or the one or more merchant processor processors to:

generate, by the one or more automobile appliance processors, a request for the transaction;

provide, by the one or more automobile appliance processors, the request to the wireless communications device for transmission to the retail device;

receive, by the one or more automobile appliance processors from the wireless communications device responsive to providing the request for the transaction, the transaction information;

provide, by the one or more automobile appliance processors, the transaction information to a consumer on the user interface in the automobile;

receive, by the one or more automobile appliance processors from the consumer, a selection of a payment account for the transaction;

retrieve, by the one or more automobile appliance processors, the VIN associated with the payment account for use within payment information in lieu of an identifier of the payment account; and provide, by the one or more automobile appliance processors, the payment information comprising the VIN and the transaction information to the retail device via the wireless communications device;

receive, by the one or more merchant processors in communication with the retail device, the payment information comprising the VIN associated with the payment account in lieu of an identifier of the payment account from the retail device;

compare, by the one or more merchant processors, a stored VIN at the merchant processor and the VIN received within the payment information; and provide, by the one or more merchant processors, the authorization for the transaction for delivery to the automobile appliance upon a match between the stored VIN and the VIN received with the payment information, receives, by the one or more merchant processors via the wireless communications device, the authorization for the transaction, wherein the authorization indicates that the payment account associated with the VIN has been approved by the merchant processor; and displays, by the one or more merchant processor, the authorization in the user interface in the automobile.

10. The one or more computer program products of claim 9, wherein the instructions further cause the one or more automobile appliance processors to: encrypt the payment information before providing the payment information comprising the VIN and transaction information to the retail device.

11. The one or more computer program products of claim 9, wherein the wireless communications device is one of a radio frequency (RF), near field communication (NFC), Bluetooth, infrared, ultraviolet, or 802.11g device.

12. The one or more computer program products as defined in claim 10, wherein encrypting the payment information uses symmetrical encryption, asymmetrical encryption, public key encryption, or pretty good privacy (PGP) encryption.

13. A system, comprising: an automobile appliance integrated into an automobile for completing a transaction with a retail device, the automobile appliance comprising: at least one first memory configured to store computer-executable instructions; a wireless communications device, the wireless communications device operable to transmit a request for a transaction to the retail device, receive transaction information associated with the transaction from the retail device, transmit payment information comprising a vehicle identification number (VIN) of the automobile and the transaction information to the retail device, and receive an authorization for the transaction, at least one first processor in communication with a user interface of the automobile and the wireless communications device and configured to access the at least one first memory and execute the computer-executable instructions to: generate a request for the transaction; provide the request to the wireless communications device for transmission to the retail device; receive, from the wireless communications device responsive to providing the request for the transaction, the transaction information; provide the transaction information to a consumer on the user interface in the automobile; receive, from the consumer, a selection of a payment account for the transaction; retrieve the VIN associated with the payment account for use within payment information in lieu of an identifier of the payment account; and provide the payment information comprising the VIN and the transaction information to the retail device via the wireless communications device for comparison with a stored VIN in a merchant processor; a timer operable to operate for a predetermined period of time and send a signal to the at least one first processor after the predetermined period of time, wherein the at least one first processor of the automobile appliance is further configured to execute the computer-executable instructions to: cancel the transaction if the authorization has not been received before receiving the signal from the timer.

a merchant processor in communication with the retail device, the merchant processor comprising: at least one second memory configured to store additional computer-executable instructions; and at least one second processor configured to access the at least one second memory and execute the additional computer-executable instructions to: receive the payment information comprising the VIN associated with the payment account in lieu of an identifier of the payment account from the retail device; compare the stored VIN at the merchant processor and the VIN received with the payment information.

14. The system of claim 13: wherein the at least one first processor is further configured to execute the computer-executable instructions to: encrypt, in an encryption module, the payment information before providing the payment information comprising the VIN and transaction information to the retail device.

15. The system of claim 13: wherein the at least one first processor is further configured to execute the computer-executable instructions to: create the payment information; provide the payment information to the user interface in the automobile for display to the consumer; and receive a signal representing the consumer's acceptance of the payment information.

* * * * *